US009801337B2

(12) United States Patent
Kasai et al.

(10) Patent No.: US 9,801,337 B2
(45) Date of Patent: Oct. 31, 2017

(54) LAWN MOWER

(71) Applicant: HONDA MOTOR CO., LTD., Tokyo (JP)

(72) Inventors: Koji Kasai, Wako (JP); Hiroaki Uchitani, Wako (JP); Hideshi Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/018,388

(22) Filed: Feb. 8, 2016

(65) Prior Publication Data
US 2016/0278287 A1   Sep. 29, 2016

(30) Foreign Application Priority Data

Mar. 27, 2015  (JP) ................................ 2015-066598

(51) Int. Cl.
*A01D 34/73*       (2006.01)
*A01D 101/00*      (2006.01)

(52) U.S. Cl.
CPC ........ *A01D 34/736* (2013.01); *A01D 2101/00* (2013.01)

(58) Field of Classification Search
CPC .... A01D 34/736; A01D 34/733; A01D 34/63; A01D 34/4166; A01D 34/4168; A01D 45/10; A01D 42/08; A01D 2101/00
USPC ......................................... 56/12.7, 255, 295
See application file for complete search history.

(56) References Cited

U.S. PATENT DOCUMENTS

| 2,529,797 | A | * | 11/1950 | Cauble | A01D 34/736 56/295 |
| 2,983,057 | A | * | 5/1961 | Erickson | A01D 42/08 15/328 |
| 3,010,269 | A | | 11/1961 | Maguire | |
| 3,336,737 | A | | 8/1967 | Belfiore | |
| 3,715,874 | A | * | 2/1973 | Goserud | A01D 34/736 56/295 |
| 4,065,913 | A | * | 1/1978 | Fisher et al. | A01D 34/4166 56/12.7 |
| 4,313,297 | A | * | 2/1982 | Maier | A01D 34/733 56/295 |
| 8,234,848 | B2 | | 8/2012 | Messina et al. | |
| 8,893,461 | B2 | * | 11/2014 | Nikkel | A01D 34/733 56/255 |

FOREIGN PATENT DOCUMENTS

| EP | 0808096      | 10/1998 |
| EP | 2 656 720 A1 | 10/2013 |
| GB | 1460225      | 12/1976 |

(Continued)

OTHER PUBLICATIONS

Japanese Office Action with partial English Translation dated Aug. 9, 2016, 5 pages.
European Search Report dated Sep. 5, 2016, 8 pages.

*Primary Examiner* — Robert Pezzuto
(74) *Attorney, Agent, or Firm* — Rankin, Hill & Clark LLP

(57) ABSTRACT

A blade disk in a lawn mower is rotatable about a rotation shaft extending in an up-down direction. A blade protection section for protecting a cutter blade mounted on the blade disk is provided integrally on the blade disk, and the cutter blade has a distal end portion located beneath the blade protection section.

6 Claims, 12 Drawing Sheets

(56) References Cited

FOREIGN PATENT DOCUMENTS

| | | |
|---|---|---|
| JP | 61-150433 | 9/1986 |
| JP | 8-275651 | 10/1996 |
| JP | 9-28154 | 2/1997 |

* cited by examiner improve blade protection section grass that protects cutter
LAWN MOWER

FIELD OF THE INVENTION

The present invention relates to a lawn mower with an improved blade protection section grass that protects cutter blades of the lawn mower.

BACKGROUND OF THE INVENTION

In recent years, development has been under way of a lawn mower of a type where a plurality of cutter blades is mounted on a blade disk drivable by a motor to rotate in a substantially horizontal plane. Such a lawn mower is popularly used as an unmanned self-propelled lawn mower (so-called robotic lawn mower), examples of which are disclosed in U.S. Pat. No. 8,234,848 (hereinafter referred to as "Patent Literature 1") and European Patent Application Publication No. 2656720 (hereinafter referred to as "Patent Literature 2").

The lawn mower disclosed in Patent Literature 1 includes: a rotation shaft extending in a vertical or up-down direction and drivable by a motor; a blade disk mounted on the rotation shaft; and a plurality of cutter blades formed integrally on the outer circumferential edge of the blade disk; and a blade protection section for protecting the cutter blades.

The lawn mower disclosed in Patent Literature 2 includes: a rotation shaft extending in a vertical or up-down direction and drivable by a motor; a blade disk mounted on the rotation shaft; and a plurality of cutter blades mounted on the blade disk; and a blade protection section for protecting the cutter blades.

In each of the aforementioned lawn mowers disclosed in Patent Literatures 1 and 2, the blade protection section comprises a cover shaped like a downwardly-opening pan and fixed to a machine body of the lawn mower. The blade protection section covers, from above, the entire blade disk and cutter blades, and the blade protection section has a lower end surface located beneath the plurality of cutter blades. Such a blade protection section is superior for protecting the cutter blades from hard projecting objects, such as stones and curbs, present on a lawn.

However, because the blade protection section disclosed in each of Patent Literatures 1 and 2 is constructed to cover, from above, the entire blade disk and cutter blades, it would unavoidably become relatively large in size and thus disadvantageously hinder an attempt to reduce the cost of the lawn mower. Besides, because the plurality of cutter blades is located above the lower end surface of the blade protection section, an effort to increase an amount of grass that can be cut at one time by the cutter blades would be limited. Therefore, further improvement has to be made for enhancing the grass cutting performance of the cutter blades.

SUMMARY OF THE INVENTION

In view of the foregoing prior art problems, it is an object of the present invention to provide an improved lawn mower capable of enhancing the grass cutting performance of the cutter blades while securing a sufficient protection performance for protecting the cutter blades from external foreign substances.

In order to accomplish the above-mentioned object, the present invention provides an improved lawn mower, which comprises: a blade disk rotatable about a rotation shaft extending in a vertical or up-down direction; a cutter blade provided on the blade disk; and a blade protection section for protecting the cutter blade, and in which the blade protection section is provided integrally on the blade disk, and the cutter blade has a distal end portion located beneath the blade protection section.

Because the blade protection section is provided integrally on the blade disk, the blade protection section is rotatable together with the blade disk. Further, the distal end portion of the cutter blade is located beneath the blade protection section. Thus, when the blade protection section rotating with the blade disk hits any external foreign substance, such as a pebble or a small piece of wood, it can flick away the external foreign substance. Thus, it is possible to secure a good protection performance for protecting the cutter blade from external foreign substances. Further, because the blade protection section rotates together with the blade disk, it is possible to reduce traveling resistance caused during travel of the lawn mower. Further, because the blade protection section is provided integrally on the blade disk, it is possible to reduce the number of necessary component parts of the lawn mower and the cost of the lawn mower as compared to a case where the blade protection section is provided as a separate component part from the blade disk.

Furthermore, because the distal end portion of the cutter blade is located beneath the blade protection section, it is possible to increase a total amount of grass that can be cut at one time by the cutter blade, so that grass cutting performance by the lawn mower can be enhanced.

Preferably, in the lawn mower of the invention, the disk blade has an opening section extending therethrough in the vertical or up-down direction, and a blade mounting section located radially inward of the opening section, the blade protection section has an annular portion formed radially outward of the opening section of the blade disk, the cutter blade extends through the opening section, and the cutter blade is mounted at its proximal end portion to the upper surface of the blade mounting section, the cutter blade having a distal end portion located beneath the blade protection section.

By extending vertically through the opening section, the cutter blade is mounted on the blade mounting section with the proximal end portion of the cutter blade located on the upper surface of the blade disk and with the distal end portion of the cutter blade located beneath the blade protection section. Therefore, a length of the cutter blade exposed beneath the blade protection section can be reduced. Accordingly, a range in which the cutter blade can be protected by the blade protection section can be increased. Thus, with the simple construction where the cutter blade merely pass vertically through the corresponding opening section, it is possible to secure a good protection performance for protecting the cutter blade from external foreign substances.

Preferably, in the lawn mower of the invention, the opening section is formed to extend elongatedly in a circumferential direction of the blade disk, one portion of the opening section has a greater opening width than other portions of the opening section, and the cutter blade extends through the one portion of the opening section having the greater opening width. Because the one portion through which the cutter blade passes (i.e., blade-passed-through portion) in the opening section formed elongatedly in the circumferential direction of the blade disk is considerably wide in width, external foreign substances, such as dirt and grass clippings, can be prevented from getting caught or stuck between the opening section and the cutter blade, which can reduce frequency of maintenance of the lawn mower. Besides, with the other portions having a smaller opening width than the one portion, it is possible to secure a sufficient overall rigidity of the blade disk.

Further, preferably, in the lawn mower of the invention, the cutter blade extends from the blade mounting section radially outward of the blade disk while slanting downward. Thus, the cutter blade extends from the blade mounting section while slanting relative to the blade disk, rotating about the vertical rotation shaft, such that the distal end portion is located lower than the proximal end portion. Generally, the lawn mower cuts grass with the blade disk kept in a posture generally parallel to the lawn, and thus, the cutter blade rotates in a posture slanting relative to the lawn surface. Therefore, an area over which the cutter blade scrapes the lawn surface that has just been subjected to the grass cutting by the cutter blade can be reduced, with the result that it is possible to reduce an amount of power consumed for driving the blade.

Further, preferably, in the lawn mower of the invention, the cutter blade is pivotable in the vertical or up-down direction at the proximal end portion relative to the blade mounting section within a preset range, and a vertical gap is provided between the cutter blade located in an upper-limit pivoting position of the cutter blade and the lower surface of the blade protection section. Thus, when the cutter blade rotating with the blade disk hits any external foreign substance, such as a pebble or a small piece of wood, present on the lawn surface, it can swing vertically away from the external foreign substance. In this way, it is possible to secure a good protection performance for protecting the cutter blade from external foreign substances. Further, with the vertical gap provided between the cutter blade located in its upper-limit pivoting position and the lower surface of the blade protection section, the cutter blade swinging vertically can be prevented from hitting the lower surface of the blade protection section. In this way, it is possible to reduce the frequency of maintenance work to be performed on the cutter blade.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

Figure 1:
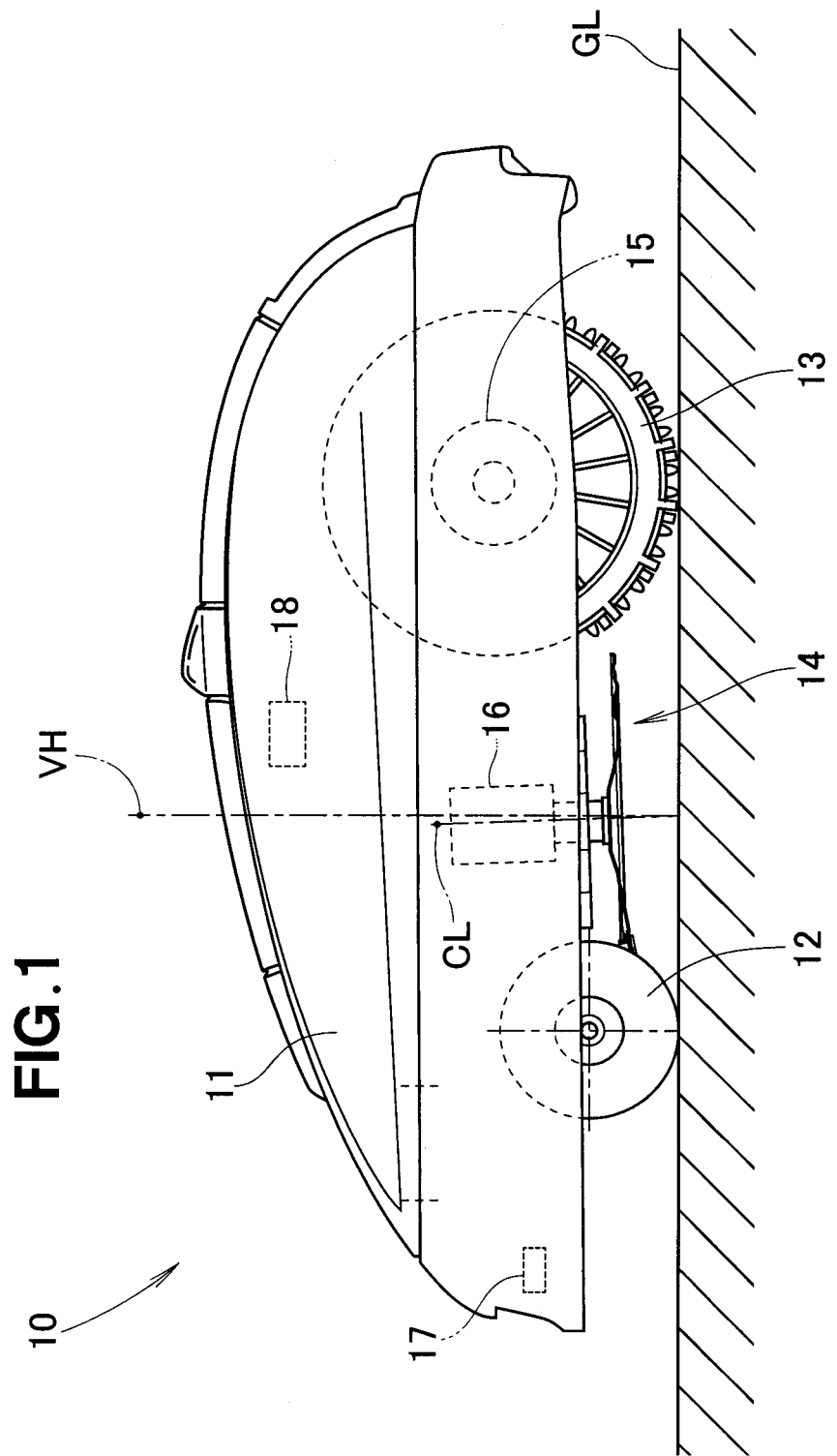
FIG. 1 is a side view showing a preferred embodiment of a lawn mower of the present invention.

FIG. 1 is a side view showing a preferred embodiment of a lawn mower 10 of the present invention which is an unmanned lawn mower (so-called robotic lawn mower) 10 self-propelled so as to cut grass on a lawn. The lawn mower 10 includes: a housing 11; left and right front wheels 12 mounted on front portions of the housing 10; left and right rear wheels 13 mounted on rear portions of the housing 10; and a grass cutting section 14 mounted on a central lower portion of the housing 11.

The housing 11 functions also as a machine body of the lawn mower 10. The left and right rear wheels 13 are drivable individually by left and right electric motors 15 (i.e., left and right travel-driving motors 15). The grass cutting section 14 is drivable by a grass-cutting electric motor 16 (grass-cutting motor 16). Each of the motors 15 and 16 is one type of power source mounted on the housing 11. Hereinafter, grass cut by the grass cutting section 14 will be referred to as "grass clippings".

The lawn mower 10 further includes various detection sensors 17, and a control section 18 that automatically controls the individual motors 15 and 16 on the basis of detection signals output from the various detection sensors 17. The various detection sensors 17 include an obstacle detection sensor (e.g., contact sensor), an angular velocity sensor and an acceleration sensor. The lawn mower 10 travels straight forward or rearward (i.e., in a front-rear direction) by the left and right travel-driving motors 15 rotating at equal speed in a forward direction or rotating at equal speed in a reverse direction. Further, the lawn motor 10 turns by any one of the left and right travel-driving motors 15 rotating in the reverse direction.

Figure 2:
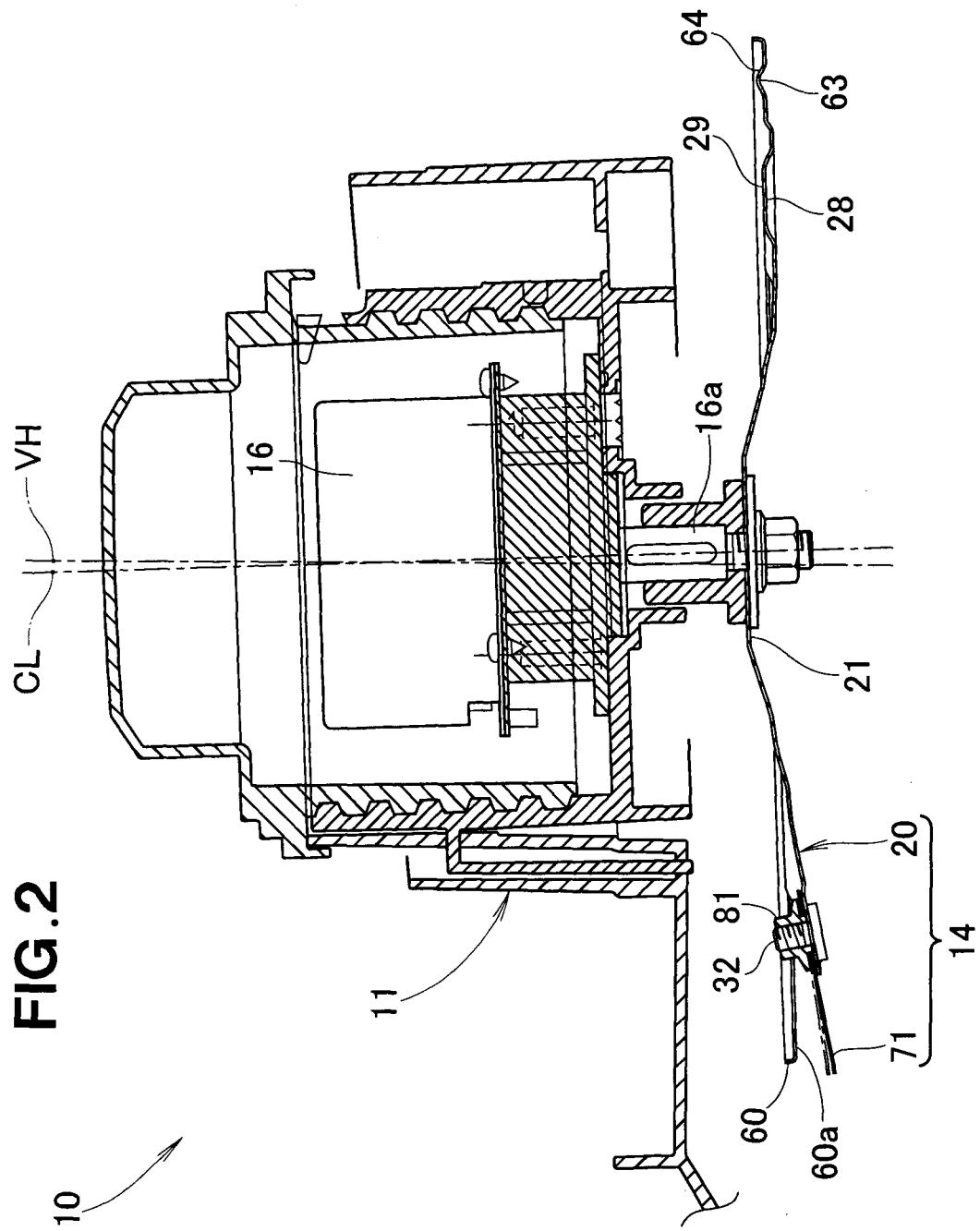
FIG. 2 is a side sectional view showing an assembled construction of a grass-cutting motor and a grass cutting section shown in FIG. 1.

As shown in FIGS. 1 and 2, the grass-cutting motor 16 has an output shaft 16*a* (rotation shaft 16*a*) extending vertically or in an up-down direction from the lower end of the motor body, out of the housing 11, toward the ground or lawn (i.e., plot of grass) surface GL. The rotation shaft 16*a* extends in the up-down direction of the housing 11 substantially perpendicularly to the horizontal lawn surface GL, i.e. the ground surface GL. Preferably, the rotation shaft 16*a* is inclined slightly rearwardly and downwardly with respect to the vertical line VH, with a view to preventing cutter blades 71 from scraping the lawn surface after the cutter blades 71 of the grass cutting section 14 have cut grass while the lawn mower 10 is traveling forward.

Figure 3:
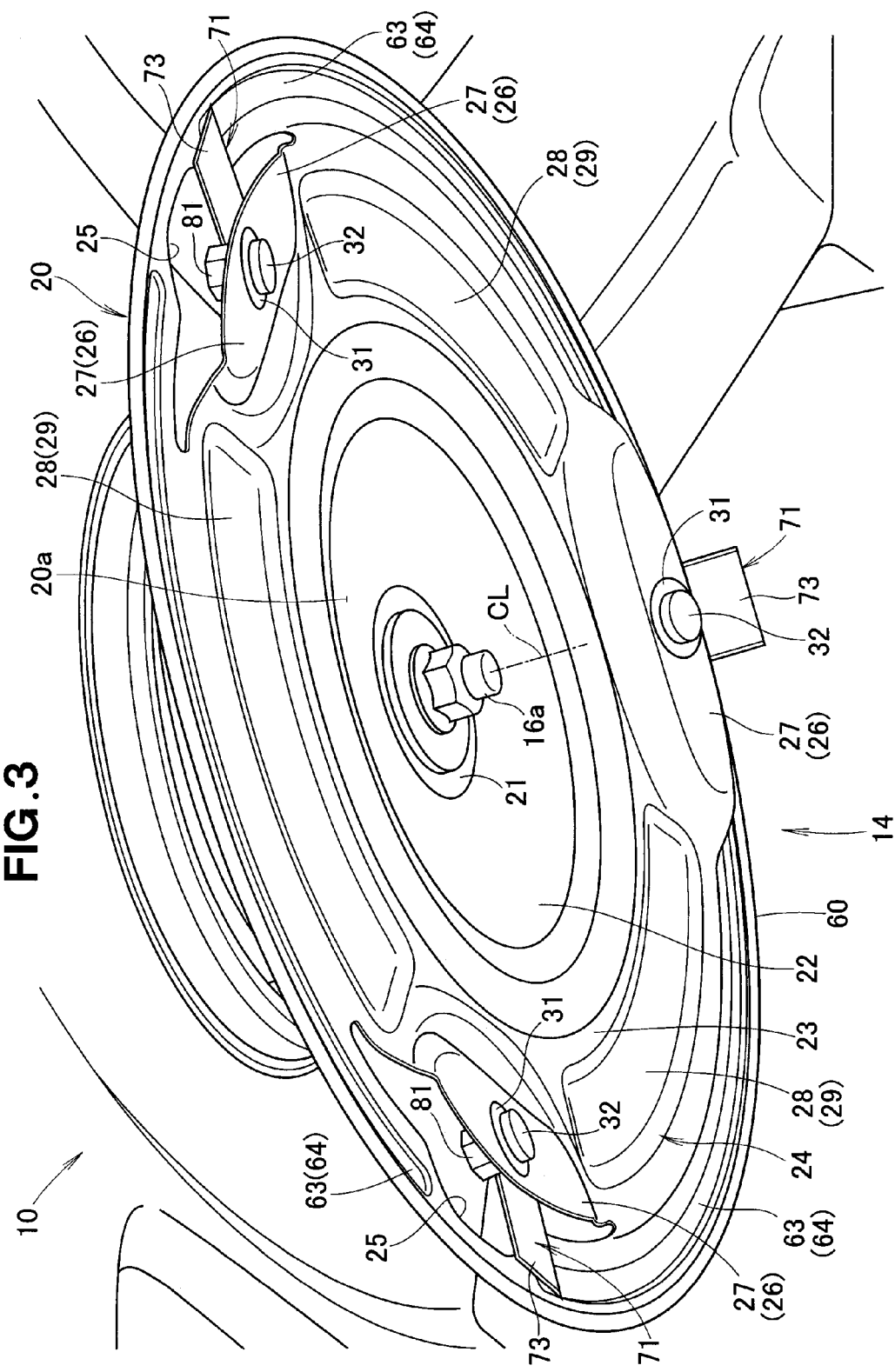
FIG. 3 is a lower perspective view of the grass cutting section shown in FIG. 2.

Further, as shown in FIGS. 2 and 3, the grass cutting section 14 includes a blade disk 20 rotatable about the vertical rotation shaft 16*a,* and the plurality of (e.g., three) cutter blades 71 mounted on the blade disk 20. The plurality of cutter blades 71 is protected by a blade protection section 60.

Figure 4:
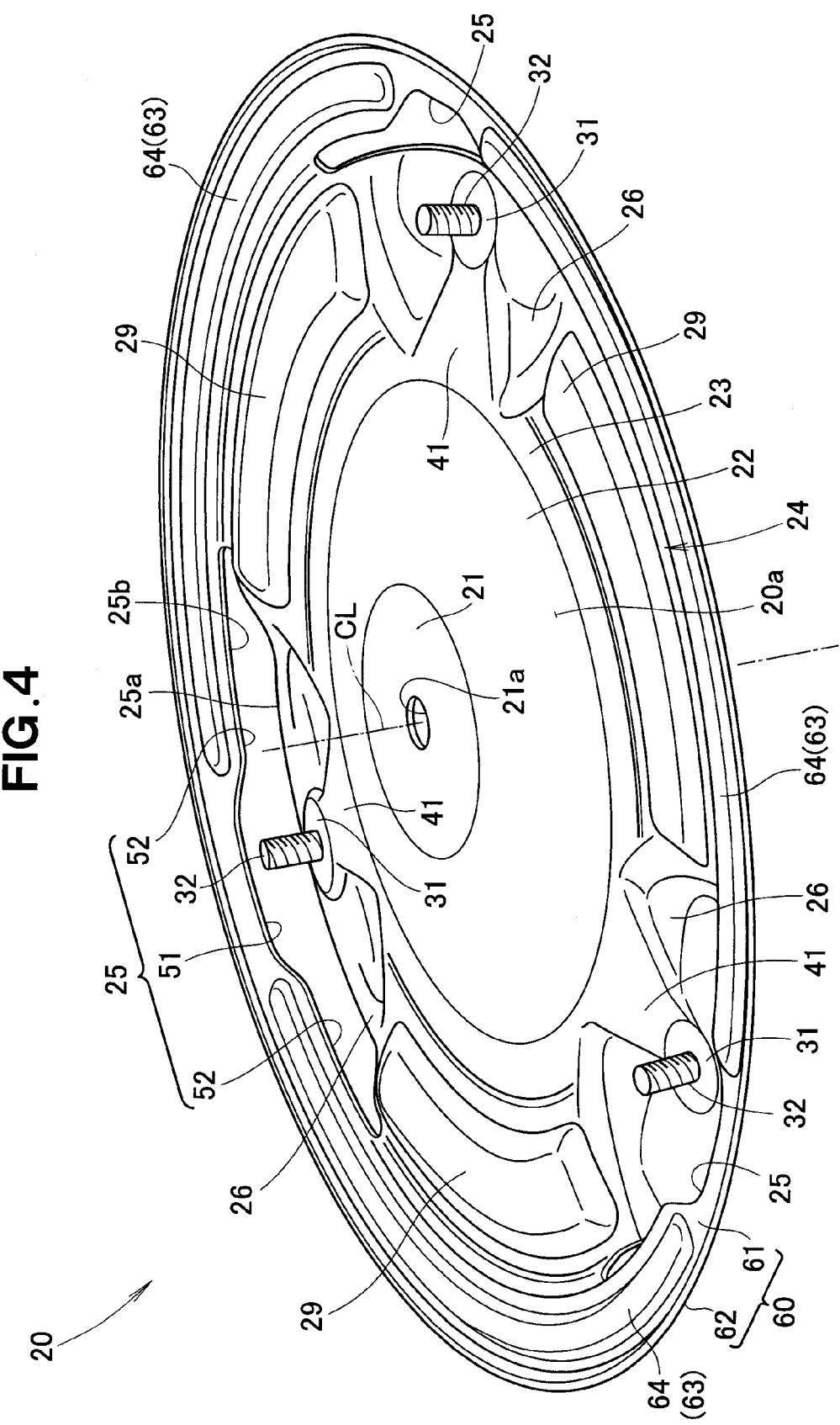
FIG. 4 is an upper perspective view of a blade disk shown in FIG. 3.
Figure 5:
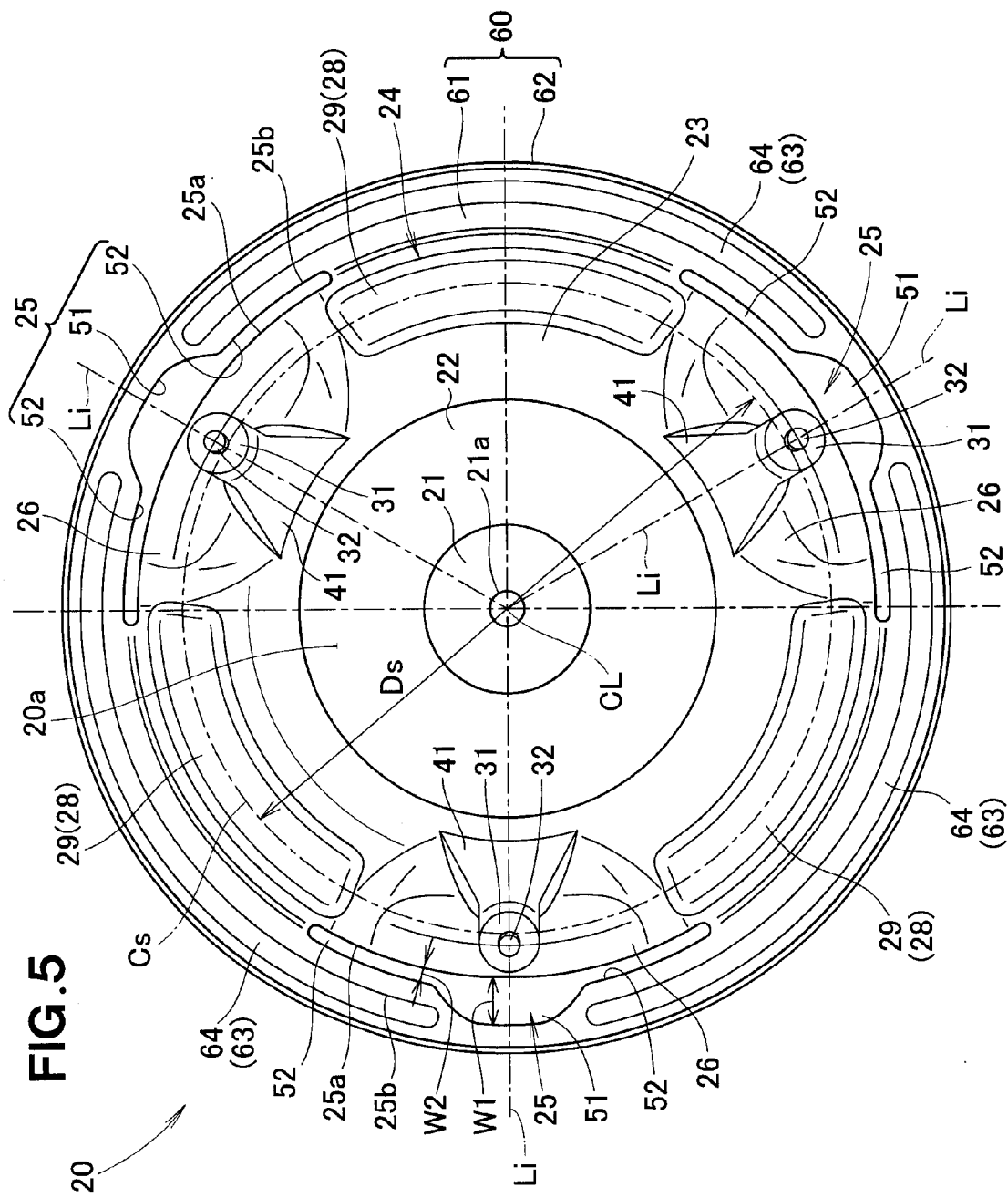
FIG. 5 is a top plan view of the blade disk shown in FIG. 4.

Further, as shown in FIGS. 3 to 5, the blade disk 20 is a member formed by press-molding a metal plate into a disk for rotation about the center axis CL of the rotation shaft 16a. The blade disk 20 integrally includes: a disk base section 21 positioned concentrically with the rotation axis or center CL (the axis or center CL of the rotation shaft 16a) of the blade disk 20; a plurality of blade mounting sections 31 positioned radially outward of the disk base section 21; a plurality of opening sections 25 positioned radially outward of the blade mounting sections 31; and the above-mentioned blade protection section 60 positioned radially outward of the plurality of opening sections 25.

The disk base section 21 is a substantially horizontal flat section formed in a disk shape as viewed in plan, and it is disposed concentrically with the rotation center CL of the blade disk 20. The disk base section 21 has a mounting hole 21a formed, through its center (i.e., through the rotation center CL of the blade disk 20), for mounting therethrough the rotation shaft 16a.

A reversely-tapered connection section 22 extends continuously from the outer circumferential edge of the disk base section 21. The reversely-tapered connection section 22 flares or spreads from the outer circumferential edge of the disk base section 21 radially outward and downward with a gentle slope, i.e. in a reversely-tapered shape. Further, an annular plate section extends continuously from the outer circumferential edge of the reversely-tapered connection section 22. The annular plate section 23 surrounds the entire outer circumferential edge of the reversely-tapered connection section 22 in a plane substantially parallel to the disk base section 21. The annular plate section 23 has formed thereon the plurality of blade mounting sections 31 and a circumferential high-rigidity section 24 that functions to increase rigidity between the blade mounting sections 31.

The plurality of (e.g., three) blade mounting sections 31 is located near the outer circumferential edge of the blade disk 20 and radially inward of the plurality of opening sections 25. More specifically, the blade mounting sections 31 are provided on, and spaced from one another at equal intervals along, an imaginary reference circle Cs that is a true circle of a diameter Ds concentric with the rotation center CL of the blade disk 20.

More, specifically, the annular plate section 23 has a plurality of depressed portions 26 each depressed downwardly from the upper surface 20a of the blade disk 20. The depressed portions 26 are located in the same angular or phase positions as corresponding ones of the blade mounting positions 31. The depressed portions 26 lie in and around the corresponding blade mounting sections 31 and adjoin the outer circumferential edge of the annular plate section 23. Each of the blade mounting sections 31 is formed on a part of the bottom of the corresponding depressed portions 26. Consequently, each of the blade mounting sections 31 is surrounded by the corresponding depressed portion 26.

Further, as shown in FIGS. 4 and 6 to 8, each of the blade mounting sections 31 extends, with a gentle slope, radially outward and downwardly in a direction from the rotation center CL of the blade disk 20 toward the outer circumferential edge of the blade disk 20. A mounting bolt 32 is secured to the lower surface of each of the blade mounting sections 31. A threaded portion 32a of each of the mounting bolts 32 extends upward through the blade mounting section 31. Imaginary straight lines L1 passing through the rotation center CL of the blade disk 20 and individual ones of the blade mounting sections 31 will each hereinafter be referred to as "phase line Li". In other words, each of the blade mounting sections 31 and each of the mounting bolts 32 are located on any one of the phase lines Li.

Figure 6:
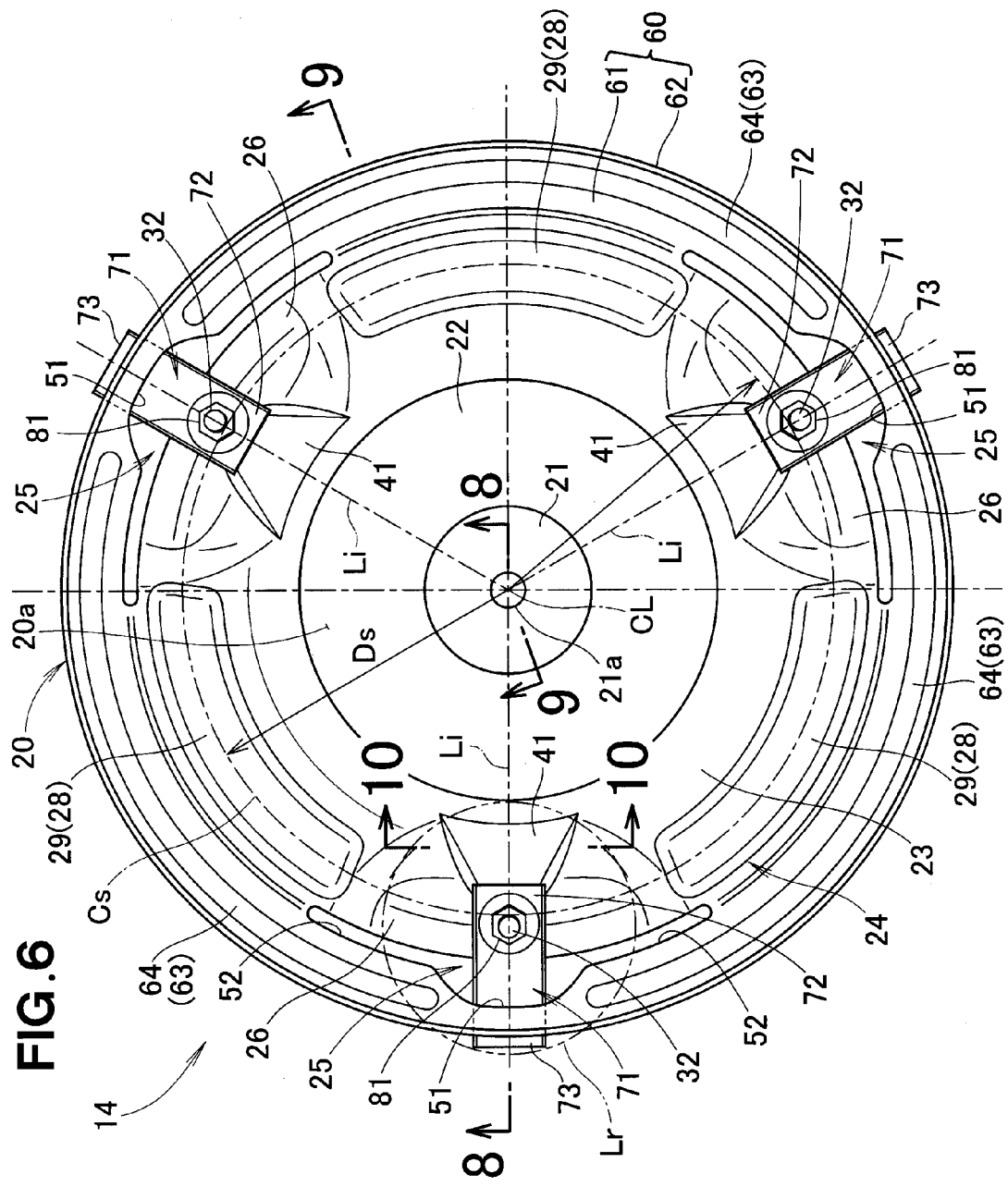
FIG. 6 is a top plan view of the grass cutting section shown in FIG. 3.
Figure 9:
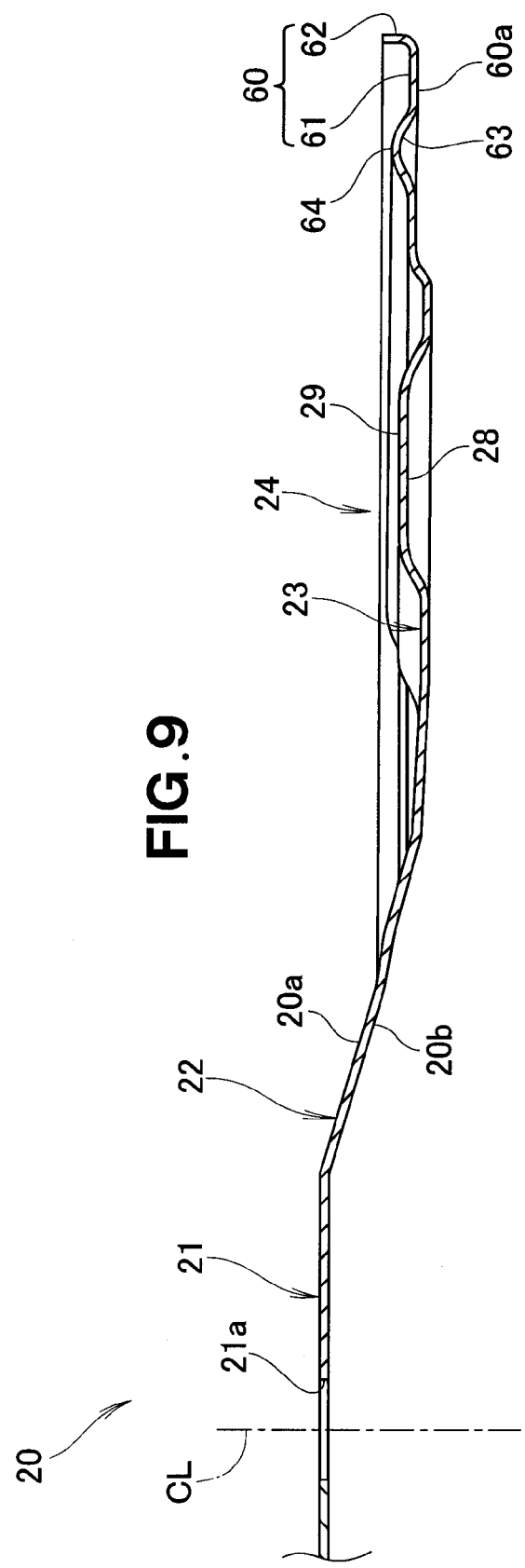
FIG. 9 is a sectional view taken along line 9-9 of FIG. 6.

Further, as shown in FIGS. 5, 6 and 9, the circumferential high-rigidity section 24 is formed in a generally concave-convex configuration by being depressed and protruded in a thickness or facewise direction of the blade disk 20 in such a manner as to interconnect the blade mounting sections 31 along the reference circle Cs. More specifically, the circumferential high-rigidity section 24 comprises the plurality of depressed portions 26 and a plurality of beads 28. The depressed portions 26 and the beads 28 are formed continuously and alternately with each other along the entire circumference of the reference circle Cs.

Figure 7:
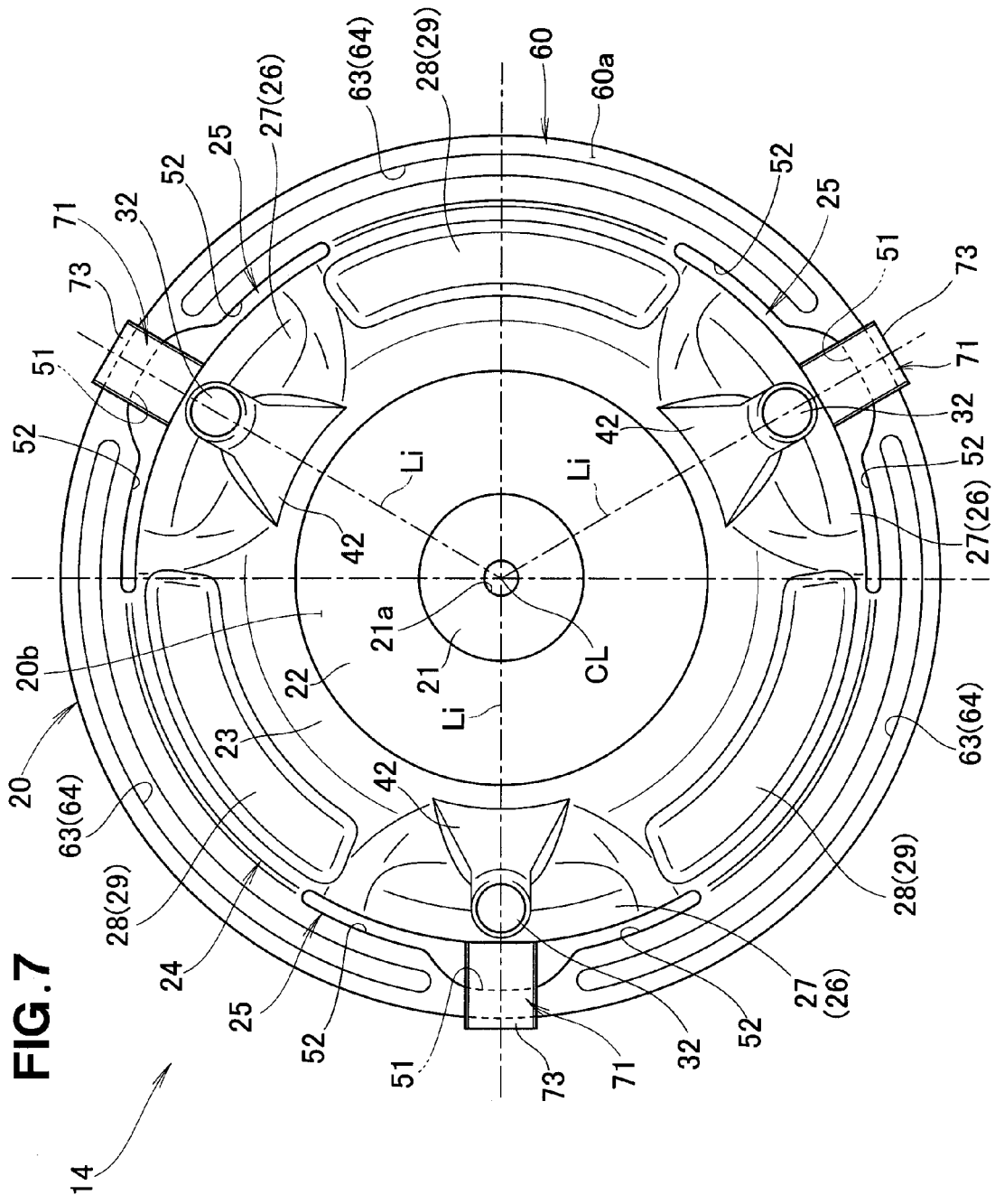
FIG. 7 is a bottom plan view of the grass cutting section shown in FIG. 3.

Further, as shown in FIGS. 3, 6 and 7, the depressed portions 26 are each a depression formed in the blade disk 20 by embossing. By the depressed portions 26 being depressed in one surface direction of the blade disk 20 like this, a plurality of protruding portions 27 is formed which protrudes in the one surface direction of the blade disk 20 and extends along the reference circle Cs, and these protruding portions 27 can function as reinforcing ribs. Because the blade disk 20 is reinforced with the protruding portions 27 extending circumferentially along the reference circle Cs, it can have an increased rigidity.

Further, as shown in FIGS. 3, 4 and 9, the beads 28 are formed in the circumferential high-rigidity section 24 and disposed at equal intervals to interconnect the depressed portions 26. The beads 28 extend elongatedly circumferentially along the reference circle Cs and are depressed upward from the lower surface 20b of the blade disk 20.

The beads 28 are each a groove formed in the blade disk 20 by embossing. By the beads 28 being depressed in one surface direction of the blade disk 20 like this, a plurality of ridges 29 is formed which protrudes in the one surface direction of the blade disk 20, and these ridges 29 can function as reinforcing ribs. Because the blade disk 20 is reinforced with the ridges 29 extending circumferentially along the reference circle Cs, it can have an increased rigidity.

Namely, with the depressed portions 26 and the beads 28 disposed alternately along the reference circle Cs, the annular plate section 23 can have an increased rigidity. Namely, the blade disk 20 has the circumferential high-rigidity section 24 formed along the reference circle Cs, so that the blade disk 20 can have an even further increased rigidity. Therefore, vibrations of the blade disk 20 during rotation can be effectively minimized. Thus, even where the blade disk 20 has a large diameter, operating sound produced due to the vibrations of the blade disk 20 during the grass cutting operation can be effectively minimized. Further, because the blade mounting sections 31 are located on the circumferential high-rigidity section 24, external force from the cutter blades 71 rotating at high speed to cut grass can be sufficiently borne by the blade mounting sections 31.

As noted above in conjunction with FIG. 4, the reversely-tapered connection section 22 flares or spreads, with a gentle slope, continuously from the outer circumferential edge of the disk base section 21 in concentric relation to the disk base section 21. Thus, the overall structure including the disk base section 21 and the reversely-tapered connection section 22 can be regarded as being of a substantially (fundamentally) flat disk shape. In the following description, the reversely-tapered connection section 22 is regarded as being included in the disk base section 21.

Figure 10:
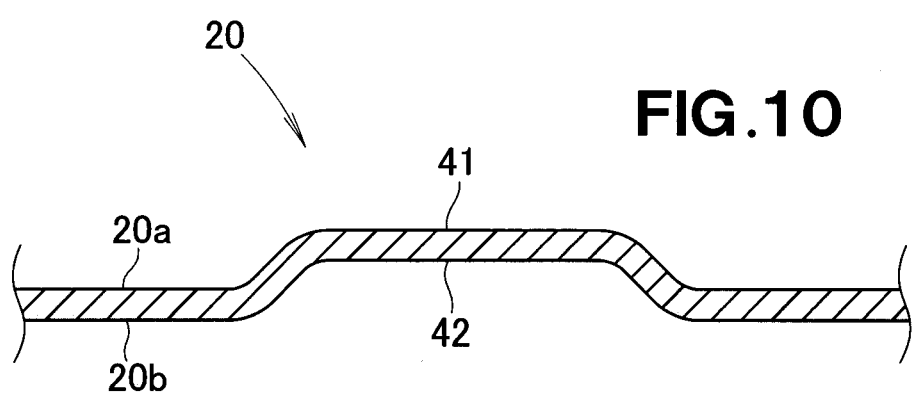
FIG. 10 is a sectional view taken along line 10-10 of FIG. 6.

Further, as shown in FIGS. 4, 6 and 10, the blade disk 20 has a plurality of radial rigid sections 41 integrally formed thereon for increasing the rigidity of portions of the blade disk 20 between the disk base section 21 (including the reversely-tapered connection section 22) and the blade mounting sections 31. The radial rigid sections 41 are located at the same angular or phase positions as the blade mounting sections 31. Namely, the radial rigid sections 41 are formed in a generally concave-convex configuration by being depressed and protruded in the thickness or facewise direction of the blade disk 20 and extend between the disk base section 21 (including the reversely-tapered connection section 22) and the blade mounting sections 31, and the radial rigid sections 41 are located radially about the rotation axis CL of the blade disk 20.

More specifically, a plurality of channel-shaped depressed portions 42 is formed, by embossing, in the blade disk 20 between the disk base section 21 (including the reversely-tapered connection section 22) and the plurality of blade mounting sections 31. By the channel-shaped depressed portions 42 being formed in one disk surface direction as above, the plurality of radial rigid sections 41 is formed which projects in the one disk surface direction. These radial rigid sections 41 can function as reinforcing ribs. By being reinforced with the radial rigid sections 41, the blade disk 20 can have an increased rigidity. Therefore, even when the blade disk waves in the axial direction of the rotation shaft 16a of the blade disk 20, it is possible to minimize deformation of the blade disk 20 due to the axial waving and thus minimize vibrations of the blade disk 20 due to the deformation of the blade disk 20.

Further, as shown in FIGS. 4 and 5, the opening sections 25 are located in the same phase positions as the blade mounting sections 31 and extend vertically through the blade disk 20. The opening sections 25 is formed to extend elongatedly in the circumferential direction of the blade disk 20 along the outer circumferential edge of the annular plate section 23, and each of the opening sections 25 is formed symmetrically, in the circumferential direction of the blade disk 20, with respect to any one of the imaginary phase lines Li.

The inner edge 25a of each of the opening sections 25 is located generally in alignment with the outer circumferential edge of the annular plate section 23 and formed in an arcuate shape along the outer circumferential edge of the annular plate section 23. Namely, the inner edge 25a of each of the opening sections 25 is of an arcuate shape concentric with the rotation center CL of the blade disk 20.

Each of the opening sections 25 includes a middle opening portion 51 located on the phase line Li, and side opening portions 52 located on both sides, along the circumferential direction of the blade disk 20, of the middle opening portion 51. The middle opening portion 51 (one portion 51 of the opening section 25) has an opening width W1 greater than an opening width W2 of each of the side opening portions 52 (i.e., other portions 52 of the opening section 25).

Figure 11:
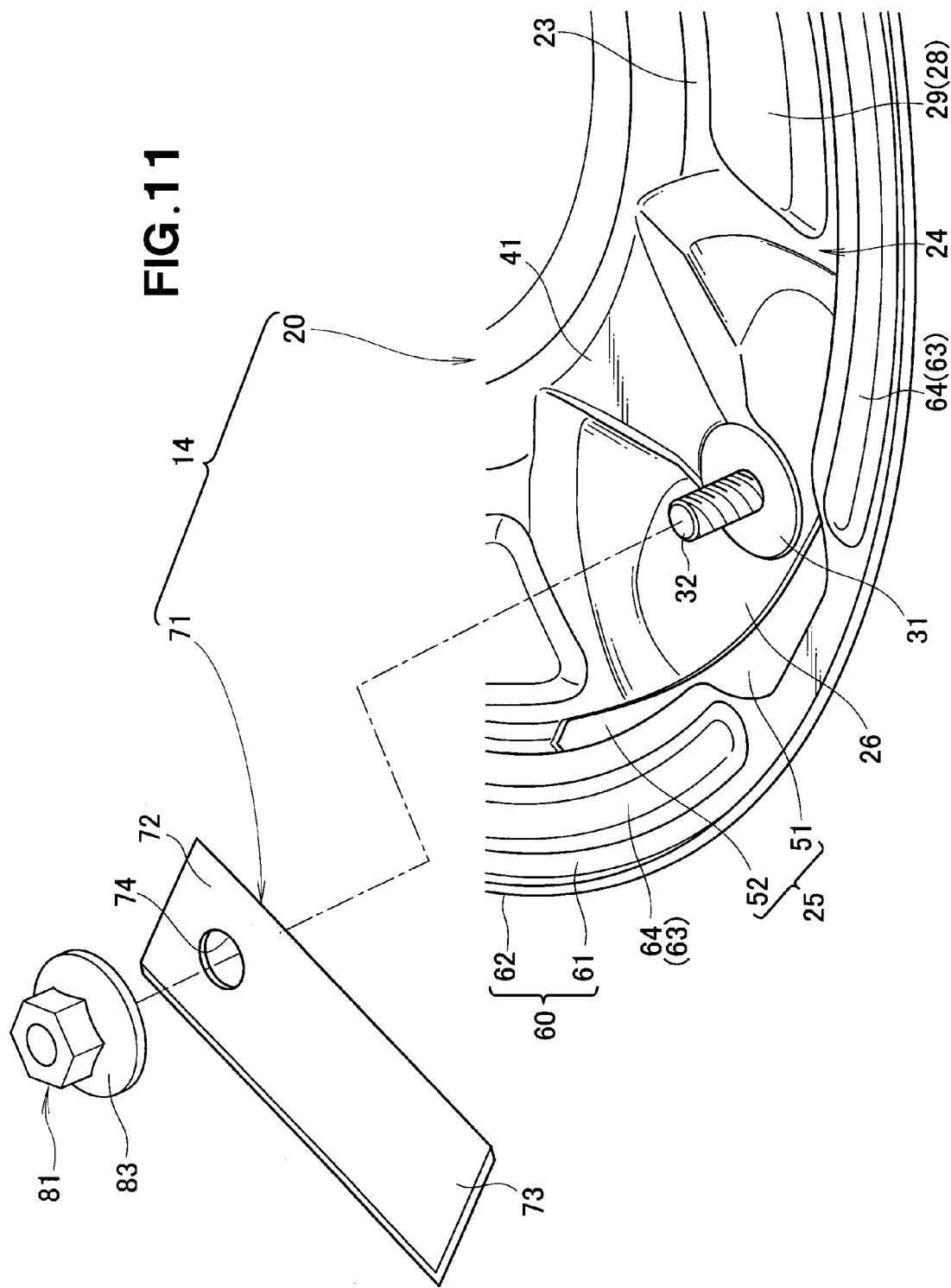
FIG. 11 is an exploded upper perspective view of the grass cutting section shown in FIG. 8.
Figure 12:
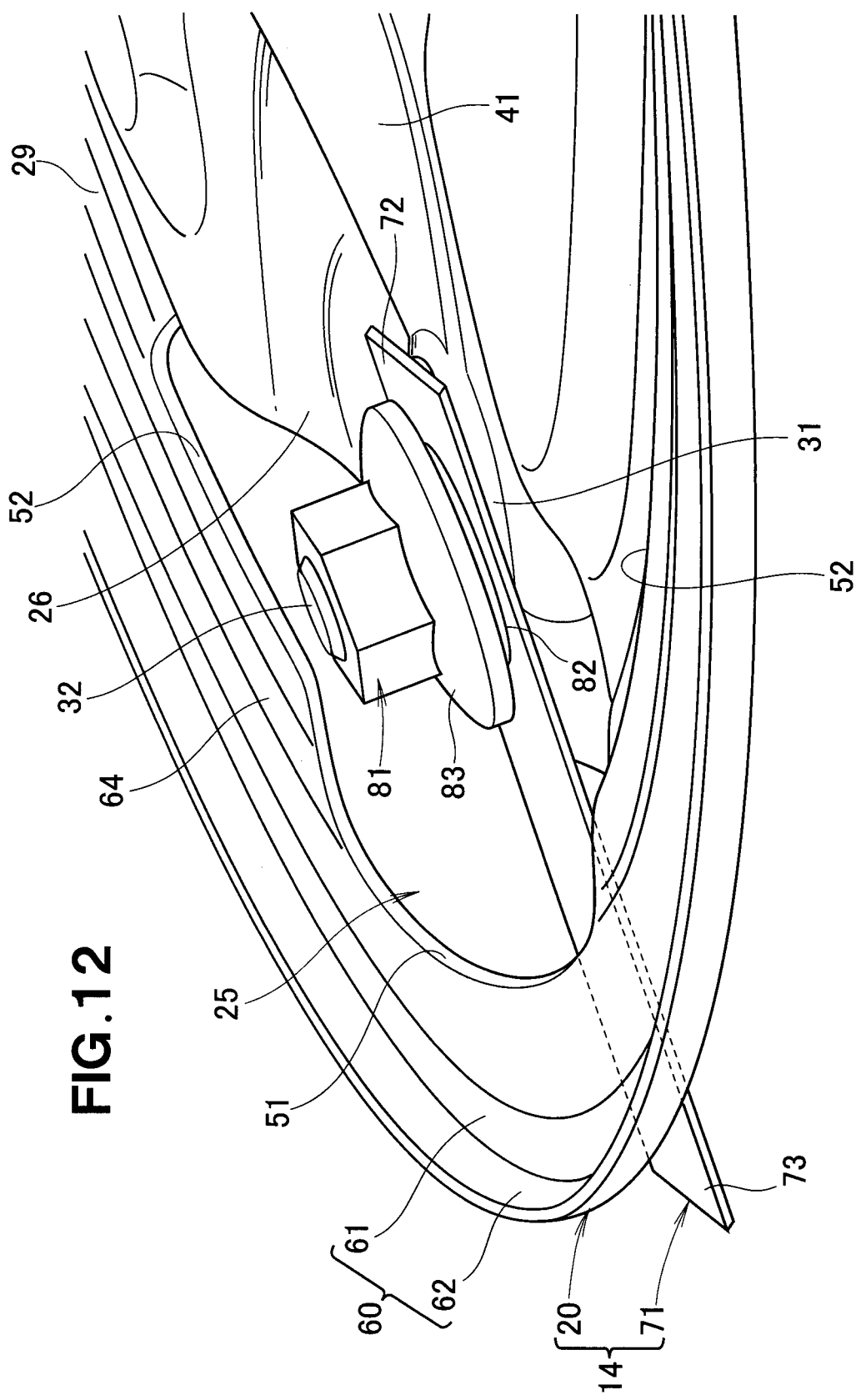
FIG. 12 is an upper perspective view of the grass cutting section shown in FIG. 8.

Further, as shown in FIGS. 5, 11 and 12, the blade protection section 60 is provided integrally on the blade disk 20. Preferably, the blade protection section 60 is an annular section formed integrally on the blade disk 20 radially outward of the plurality of opening sections 25.

More specifically, the blade protection section 60 comprises an annular horizontal portion 61 extending substantially horizontally continuously from the outer circumferential edge of the annular plate section 23, and a flange 62 projecting upward from the entire outer circumferential edge of the annular horizontal portion 61.

Further, as shown in FIGS. 4, 5 and 9, a plurality of elongated beads 63 is formed in the annular horizontal portion 61 along the outer circumference of the annular plate section 23, and these elongated beads 63 extend between the middle opening portions 51. Each of the plurality of elongated beads 63 is depressed upward from the lower surface 20b of the blade disk 20. Namely, as viewed from the lower surface 20b of the blade disk 20, each of the plurality of elongated beads 63 is a groove formed in the lower surface 20b of the blade disk 20 by embossing. By the elongated beads 63 being formed by the annular horizontal portion 61 being depressed in one disk surface direction of the blade disk 20, a plurality of ridges 64 projecting in the one disk surface direction is formed on the blade disk 20. These ridges 64 can function as elongated reinforcing ribs. By being reinforce with the plurality of ridges 64, the blade disk 20 can have an even further increased rigidity.

As apparent from the foregoing, the opening sections 25 are located on the corresponding phase lines Li and between the annular plate section 23 and the blade protection section 60. Further, the inner edge 25a of each of the opening sections 25 is located at a lower position of the blade disk 20 than the outer edge 25b of the opening section 25.

The following describe, with reference to FIGS. 6, 8, 11 and 12, the plurality of cutter blades 71. Each of the cutter blades 71 is formed of a straight metal plate material having a substantially rectangular shape as viewed in plan.

The cutter blades 71 extend radially through corresponding ones of the opening sections 25. More specifically, each of the cutter blades 71 extends on and along the corresponding phase line Li through the middle opening portion 51 of the greater opening width W1 (see FIG. 5) of the corresponding opening section 25. The middle opening portion 51 will sometimes be referred to as "opening portion 51 having the cutter blade 71 passed therethrough" or "blade-passed-through portion 51".

Each of the cutter blades 71 is mounted at its proximal end portion 72 to the upper surface of the corresponding blade mounting section 31, and it has a distal end portion 73 located lower than the blade protection section 60. Thus, each of the cutter blades 71 extends from the corresponding blade mounting section 31 radially outward of the blade disk while slanting downward.

Figure 8:
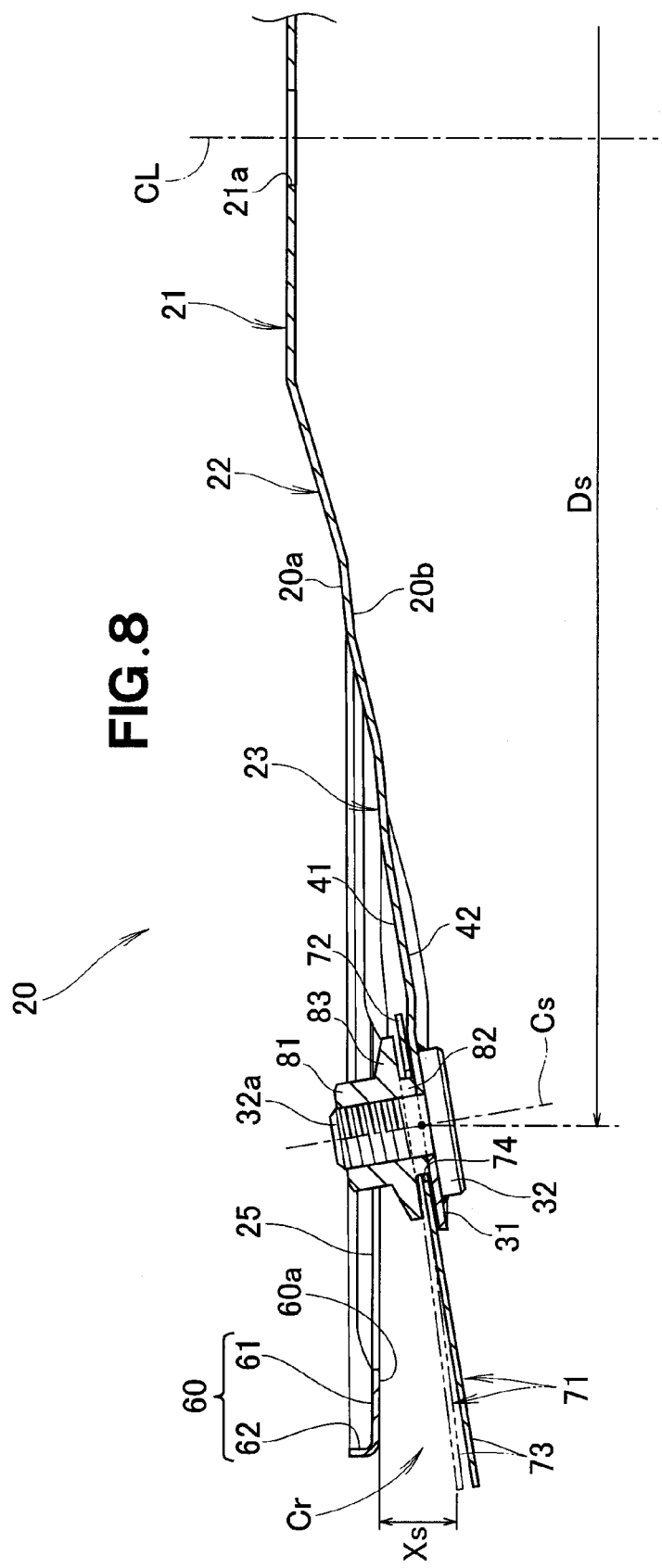
FIG. 8 is a sectional view taken along line 8-8 of FIG. 6.

A specific mounting structure of each of the cutter blades 71 is as follows. Namely, as shown in FIGS. 3, 8 and 11, each of the cutter blades 71 is fastened at its proximal end portion 72 to the corresponding blade mounting section 31 by means of a mounting bolt 32 and a nut 81.

The proximal end portion 72 has a circular through-hole 74 formed therein. A bottom surface portion of the nut 81 superposed on the upper surface of the blade mounting section 31 integrally includes a circular small-diameter portion 82 and a large-diameter portion 83 (flange portion 83) greater in diameter than the small-diameter portion 82. The diameter of the small-diameter portion 82 is smaller than the diameter of the through-hole 74 of the proximal end portion 72. A height from the bottom surface of the nut 81 to the lower surface of the large-diameter portion 83 is greater than the plate thickness of the proximal end portion 72.

The cutter blade 71 is mounted at the proximal end portion 72 to the blade mounting section 31 by the proximal end portion 72 being superposed on the upper surface of the blade mounting section 31 and the nut 81 being screwed onto the mounting bolt 32. A screwed-onto position of the nut 81 relative to the mounting bolt 32 is determined by the bottom surface of the nut 81 abutting against the upper surface of the nut 81.

As apparent from the foregoing, each of the cutter blades 71 is pivotable at the proximal end portion 72 vertically relative to the corresponding blade mounting section 31, i.e. in a longitudinal direction of the threaded portion 32a, by an amount equal to a difference between a height from the bottom surface of the nut 81 to the lower surface of the large-diameter portion 83 and the plate thickness of the proximal end portion 72. Namely, each of the cutter blades 71 is vertically pivotable at the proximal end portion 72 relative to the corresponding blade mounting section 31 within a preset range Xs, i.e. a vertical pivotable range Xs of the distal end of the cutter blade 71. Thus, when the cutter blade 71 rotating with the blade disk 20 hits any external foreign substance, such as a pebble or a small piece of wood, present on the lawn surface GL (see FIG. 1), it can swing vertically away from the external foreign substance, as seen from FIG. 6. In this way, it is possible to secure a good protection performance for protecting each of the cutter blades 71 from external foreign substances.

Further, as shown in FIG. 8, a vertical gap Cr is provided between the cutter blade 71 located in an upper-limit pivoting position depicted by a phantom line and the lower surface 60a of the blade protection section 60, so that the cutter blade 71 swinging vertically can be prevented from hitting the lower surface 60a of the blade protection section 60. In this way, it is possible to reduce frequency of maintenance work to be performed on the cutter blades 71.

Further, as shown in FIG. 6, each of the cutter blades 17 is rotatable about the corresponding mounting bolt 32 along a rotation trajectory Lr. A depth and width of each of the depressed portions 26 where the mounting bolts 32 are located are set so as to allow the corresponding cutter blade 71 to rotate within the range of the rotation trajectory Lr. Further, when the cutter blade 71 rotates within the range of the rotation trajectory Lr, it passes through not only the middle opening portion 51 but also the side opening portions 52. When the rotating cutter blade 71 hits any external foreign substance, it can vertically pivot about the mounting bolt 32 away from the external foreign substance. Thus, it is possible to secure a good protection performance for protecting each of the cutter blades 71 from external foreign substances.

The foregoing description may be summarized as follows. As seen in FIG. 8, the blade protection section 60 is provided integrally on the blade disk 20, and thus, the blade protection section 60 is rotatable together with the blade disk 20. Further, the distal end portion 73 of each of the cutter blades 73 is located beneath the blade protection section 60. Thus, when the blade protection section 60 rotating with the blade disk 20 hits any external foreign substance, such as a pebble or a small piece of wood, it can flick away the external foreign substance. Thus, it is possible to secure a good protection performance for protecting each of the cutter blades 71 from external foreign substances.

Further, because the blade protection section 60 rotates together with the blade disk 20, it is possible to reduce traveling resistance caused during travel of the lawn mower 10. Further, because the blade protection section 60 is provided integrally on the blade disk 20, it is possible to reduce the number of necessary component parts of the lawn mower 10 and the cost of the lawn mower 10 as compared to a case where the blade protection section 60 is provided as a separate component part from the blade disk 20.

Furthermore, because the distal end portion 73 of each of the cutter blades 73 is located beneath the blade protection section 60, it is possible to increase a total amount of grass that can be cut at one time by the individual cutter blades 71, so that grass cutting performance by the individual cutter blades 71 and hence the lawn mower 10 can be enhanced.

Furthermore, by extending vertically through the corresponding opening section 25, each of the cutter blades 71 is mounted on the corresponding blade mounting section 31 with the proximal end portion 72 located on the upper surface of the blade disk 20 and with the distal end portion 73 of the cutter blade 71 located beneath the blade protection section 60, as shown in FIGS. 8 and 12. Therefore, a length of the cutter blade 71 exposed beneath the blade protection section 60 can be reduced. Accordingly, a range in which the cutter blade 71 can be protected by the blade protection section 60 can be increased. Thus, with the simple construction where the cutter blades 71 merely pass vertically through the corresponding opening sections 25, it is possible to secure a good protection performance for protecting each of the cutter blades 71 from external foreign substances.

Furthermore, as shown in FIGS. 5 and 6, the opening width W1 of each of the middle opening portions 51 is greater than the opening width W2 of each of the side opening portions 52. Because the middle opening portion 51 through which the cutter blade 71 passes is considerably wide in width, external foreign substances, such as dirt and grass clippings, can be prevented from getting caught or stuck between the opening section 25 and the cutter blade 71, which also can reduce the frequency of maintenance of the lawn mower 10. Besides, with each of the side opening portions 52 having the opening width W2 smaller than the opening width W1 of the middle opening portion 51, it is possible to secure a sufficient overall rigidity of the blade disk 20.

Furthermore, as shown in FIGS. 3 and 12, each of the cutter blades 71 extends from the corresponding blade mounting section 31 radially outward while slanting downward, and thus, the cutter blade 71 slants relative to the blade disk 20, rotating about the vertical rotation shaft 16a, such that the distal end portion 73 is located lower than the proximal end portion 72. Generally, the lawn mower 10 cuts grass with the blade disk 20 kept in a posture generally parallel to the lawn GL (see FIG. 1), and thus, the cutter blades 71 rotate in a posture slanting relative to the lawn surface GL. Therefore, an area over which each of the cutter blades 71 scrapes the lawn surface that has just been subjected to the grass cutting by the cutter blade 71 can be reduced, with the result that it is possible to reduce an amount of power consumed for driving the blade 17.

In the aforementioned way, the lawn mower of the present invention can significantly enhance the grass cutting performance of the cutter blades 71 while securing the protection performance for protecting the cutter blades 71 from external force.

The basic principles of the present invention are well suited for application to unmanned self-propelled lawn mowers.

What is claimed is:

1. A lawn mower comprising:
   a blade disk rotatable about a rotation shaft extending in an up-down direction;
   a cutter blade provided on the blade disk; and
   a blade protection section for protecting the cutter blade,
   wherein the blade protection section is provided integrally on the blade disk,
   the disk blade has an opening section extending therethrough in the up-down direction, and a blade mounting section located radially inward of the opening section,
   the blade protection section has an annular portion formed radially outward of the opening section of the blade disk,
   the cutter blade extends through the opening section, and
   the cutter blade is mounted at a proximal end portion to an upper surface of the blade mounting section, the cutter blade having a distal end portion located beneath the blade protection section.

2. The lawn mower according to claim 1, wherein the opening section is formed to extend elongatedly in a circumferential direction of the blade disk, one portion of the opening section has a greater opening width than other portions of the opening section, and
the cutter blade extends through the one portion of the opening section having the greater opening width.

3. The lawn mower according to claim 1, wherein the cutter blade extends from the blade mounting section radially outward of the blade disk while slanting downward.

4. The lawn mower according to claim 1, wherein the cutter blade is pivotable in the up-down direction at the proximal end portion relative to the blade mounting section within a preset range, and a vertical gap is provided between the cutter blade located in an upper-limit pivoting position of the cutter blade and a lower surface of the blade protection section.

5. The lawn mower according to claim 1, wherein the blade disk integrally includes a disk base section of a flat disk shape mounted on the rotation shaft and an annular plate section surrounding the disk base section, the annular portion of the blade protection section comprises an annular horizontal portion extending substantially horizontally continuously from an outer circumferential edge of the annular plate section and a flange projecting upward from an entire outer circumferential edge of the annular horizontal portion.

6. The lawn mower according to claim 5, wherein a ridge is formed in the annular horizontal portion along the outer circumferential edge of the annular plate section.

* * * * *